US012692163B2

(12) United States Patent
Moghimian et al.

(10) Patent No.: US 12,692,163 B2
(45) Date of Patent: Jul. 28, 2026

(54) ANODE PARTICLES INCLUDING DISCARDED GRAPHITE PARTICLES, AND METHODS OF PRODUCING THE SAME

(71) Applicant: NanoXplore Inc., Montreal (CA)

(72) Inventors: Nima Moghimian, Saint Laurent (CA); Soroush Nazarpour, Saint-Laurent (CA)

(73) Assignee: NanoXplore Inc., Montreal (CA)

( * ) Notice: Subject to any disclaimer, the term of this patent is extended or adjusted under 35 U.S.C. 154(b) by 0 days.

(21) Appl. No.: 19/098,493

(22) Filed: Apr. 2, 2025

(65) Prior Publication Data

US 2025/0230050 A1     Jul. 17, 2025

Related U.S. Application Data

(62) Division of application No. 18/631,455, filed on Apr. 10, 2024, now Pat. No. 12,291,455.

(Continued)

(51) Int. Cl.
*C01B 32/21*            (2017.01)
(52) U.S. Cl.
CPC .......... *C01B 32/21* (2017.08); *C01P 2004/61* (2013.01); *C01P 2004/84* (2013.01); *C01P 2006/40* (2013.01); *C01P 2006/80* (2013.01)
(58) Field of Classification Search
CPC .. C01B 32/21; C01P 2004/61; C01P 2004/84; C01P 2006/40; C01P 2006/80; H01M 4/625; H01M 4/96
See application file for complete search history.

(56) References Cited

U.S. PATENT DOCUMENTS

| 9,469,542 B2 | 10/2016 | Bozalina et al. |
| 10,079,389 B2 | 9/2018 | Do et al. |

(Continued)

FOREIGN PATENT DOCUMENTS

| CA | 3098915 A1 | 7/2019 |
| CN | 108565403 A | 9/2018 |

(Continued)

OTHER PUBLICATIONS

Abrego-Martinez, Juan Carlos, et al. "From waste graphite fines to revalorized anode material for Li-ion batteries." Carbon 209 (2023): 118004.*

(Continued)

*Primary Examiner* — Richard M Rump
(74) *Attorney, Agent, or Firm* — COOLEY LLP

(57)     ABSTRACT

Embodiments described herein relate to anode particles produced in part from discarded graphite particles, and methods of producing the same. In some aspects, a method of forming carbon-coated anode particles can include mixing a first plurality of particles, a second plurality of particles, and a plurality of graphene particles to form a dry powder, the first plurality of graphite particles including particles rejected from a graphite spheronization process, the second plurality of graphite particles including particles rejected from a graphite micronization process, mixing the dry powder with water and a carbon-containing liquid to form a slurry, spray-drying the slurry to form an agglomerated mix, and heating the agglomerated mix to form carbon-coated anode particles. In some embodiments, the spray-drying includes atomizing the slurry to form droplets. In some embodiments, the spray-drying can include heating the droplets in a heated chamber to form dried particles.

7 Claims, 11 Drawing Sheets

Related U.S. Application Data

(60) Provisional application No. 63/458,514, filed on Apr. 11, 2023.

(56) References Cited

U.S. PATENT DOCUMENTS

| | | | |
|---|---|---|---|
| 10,644,309 | B2 | 5/2020 | Do et al. |
| 12,291,455 | B2 | 5/2025 | Moghimian et al. |
| 2004/0150312 | A1 | 8/2004 | McElrath et al. |
| 2005/0106098 | A1 | 5/2005 | Tsang et al. |
| 2006/0134524 | A1 | 6/2006 | Nakai et al. |
| 2009/0020734 | A1 | 1/2009 | Jang et al. |
| 2009/0117467 | A1 | 5/2009 | Zhamu et al. |
| 2010/0308277 | A1 | 12/2010 | Grupp et al. |
| 2011/0311869 | A1 | 12/2011 | Oh et al. |
| 2012/0064409 | A1 | 3/2012 | Zhamu et al. |
| 2012/0261610 | A1 | 10/2012 | Paulsen et al. |
| 2012/0282527 | A1 | 11/2012 | Amine et al. |
| 2012/0288750 | A1 | 11/2012 | Kung et al. |
| 2013/0260152 | A1 | 10/2013 | Murray et al. |
| 2013/0309495 | A1 | 11/2013 | Do et al. |
| 2014/0255785 | A1 | 9/2014 | Do et al. |
| 2015/0086860 | A1 | 3/2015 | Yokoi et al. |
| 2016/0211511 | A1* | 7/2016 | Ren ....................... H01M 4/386 |
| 2016/0256873 | A1 | 9/2016 | Do et al. |
| 2017/0047584 | A1* | 2/2017 | Hwang ................. H01M 4/366 |
| 2018/0083272 | A1 | 3/2018 | Son et al. |
| 2018/0241032 | A1 | 8/2018 | Pan et al. |
| 2018/0241033 | A1 | 8/2018 | Do et al. |
| 2019/0214640 | A1* | 7/2019 | Salem ................... H01M 4/134 |
| 2020/0168900 | A1 | 5/2020 | Jang |
| 2021/0020941 | A1 | 1/2021 | Zhou et al. |
| 2022/0115646 | A1 | 4/2022 | Colwell et al. |
| 2022/0285686 | A1 | 9/2022 | Kim et al. |
| 2022/0367857 | A1* | 11/2022 | Zhou ................... H01M 4/1393 |
| 2023/0155135 | A1 | 5/2023 | Moghimian et al. |
| 2023/0163282 | A1* | 5/2023 | Lin ................... H01M 10/0525 |
| | | | 429/209 |
| 2024/0105919 | A1 | 3/2024 | Kim et al. |
| 2024/0343586 | A1 | 10/2024 | Moghimian et al. |
| 2025/0289720 | A1 | 9/2025 | Moghimian et al. |

FOREIGN PATENT DOCUMENTS

| | | | |
|---|---|---|---|
| CN | 109786670 | B | 8/2021 |
| CN | 114497489 | A | 5/2022 |
| CN | 114975918 | A | 8/2022 |
| EP | 3758105 | A1 | 12/2020 |
| KR | 20150128430 | A | 11/2015 |
| WO | WO-2011057074 | A2 | 5/2011 |
| WO | WO-2012154183 | A1 | 11/2012 |
| WO | WO-2013173053 | A1 | 11/2013 |
| WO | WO-2016057369 | A2 | 4/2016 |
| WO | WO-2020154235 | A1 | 7/2020 |
| WO | WO-2023184042 | A1 | 10/2023 |
| WO | WO-2023224177 | A1 | 11/2023 |
| WO | WO-2025189293 | A1 | 9/2025 |

OTHER PUBLICATIONS

Abrego-Martinez, et al., "From Waste Graphite Fines to Revalorized Anode Material for Li-ion Batteries," Carbon 209, Jun. 2023, 118004, 12 pages.

Chen, X., et al., "Structural and mechanical characterization of platelet graphite nanofibers," Carbon, vol. 45, Issue 2, Feb. 2007, pp. 416-423.

Geim, A. K. and Novoselov, K. S., "The rise of graphene," Nature Materials, vol. 6, Mar. 1, 2007, pp. 183-191.

International Search Report and Written Opinion for International Application No. PCT/US2015/053939, mailed on Jan. 27, 2016, 15 pages.

International Search Report and Written Opinion for PCT Application No. PCT/CA2023/050445 dated Jul. 12, 2023, 10 pages.

International Search Report for Application No. PCT/US2020/014311, dated May 29, 2020, 3 pages.

Invitation to pay additional fees for International Application No. PCT/CA2024/050456 dated Apr. 22, 2024, 2 pages.

Liu et al., "A yolk-shell design for stabilized and scalable Li-Ion battery alloy anodes," Nano Letters, Jun. 2012, 12(6), pp. 3315-3321.

Mo, Z., et al., "Preparation and characterization of a PMMA/Ce(OH)3, Pr2O3/graphite nanosheet composite," Polymer, Dec. 12, 2005, vol. 46, Issue 26, pp. 12670- 12676.

Non-Final Office Action for U.S. Appl. No. 17/421,889 dated Apr. 22, 2024, 13 pages.

Notice of Allowance for U.S. Appl. No. 15/517,417, mailed Feb. 3, 2020, 7 pages.

Notice of Allowance for U.S. Appl. No. 18/631,455 mailed Jan. 10, 2025, 10 pages.

Novoselov, K. S., et al., "Two-dimensional atomic crystals," PNAS, Jul. 26, 2005, vol. 102, No. 30, pp. 10451-10453.

Office Action for Chinese Application No. 201580053935.9, dated Nov. 14, 2019, 17 pages.

Office Action for U.S. Appl. No. 15/517,417, mailed Jul. 12, 2019, 10 pages.

Restriction Requirement for U.S. Appl. No. 15/517,417, mailed Apr. 4, 2019, 6 pages.

Restriction Requirement for U.S. Appl. No. 18/631,455 mailed Oct. 28, 2024, 8 pages.

Schonherr et al., "Tailored Pre-lithiation Using Melt-Deposited Lithium Thin Films", Batteries. Jan. 12, 2023, vol. 9(53), 13 pages.

Wu et al., "A LiF Nanoparticle-Modified Graphene electrode for High-Power and High-Energy Lithium Ion Batteries," Advanced Functional Materials, Aug. 2012, 22(15), pp. 3290-3297.

International Search Report and Written Opinion for PCT Application No. PCT/CA2024/050456 dated Jun. 11, 2024, 10 pages.

Examiner's Interview Summary for U.S. Appl. No. 17/421,889 mailed Apr. 30, 2025, 2 pages.

International Search Report and Written Opinion for PCT Application No. PCT/CA2025/050346 mailed May 21, 2025, 11 pages.

Non-Final Office Action for U.S. Appl. No. 17/421,889 mailed May 16, 2025, 12 pages.

PCT Application No. PCT/CA2024/050456, International Preliminary Report on Patentability mailed Oct. 23, 2025; Applicant NanoXplore Inc.; 6 pages.

U.S. Appl. No. 17/421,889, Final Office Action mailed Feb. 13, 2026; Inventor Colwell et al.; 12 pages.

* cited by examiner

Figure 3:
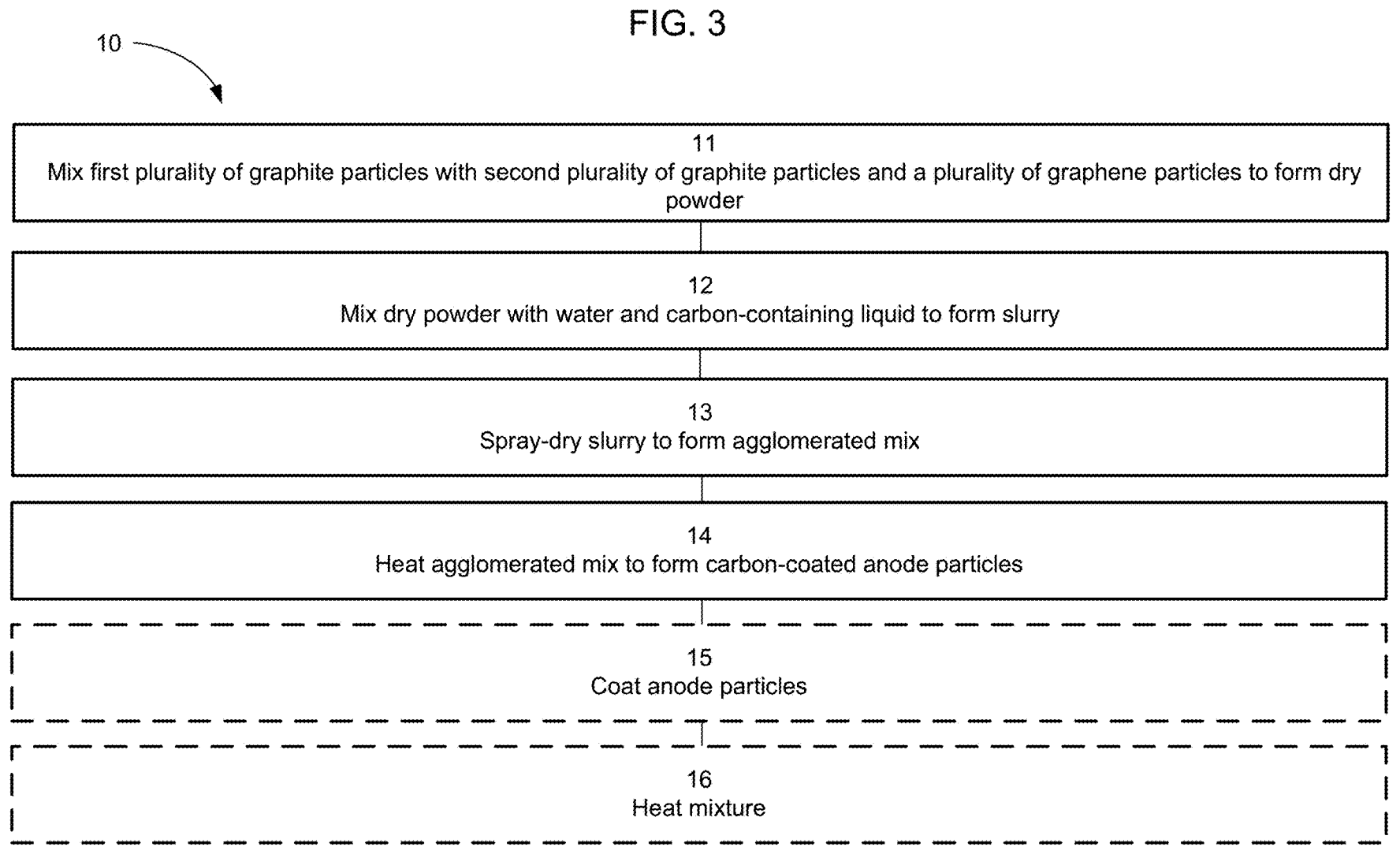

11 — Mix first plurality of graphite particles with second plurality of graphite particles and a plurality of graphene particles to form dry powder 12 — Mix dry powder with water and carbon-containing liquid to form slurry 13 — Spray-dry slurry to form agglomerated mix 14 — Heat agglomerated mix to form carbon-coated anode particles 15 — Coat anode particles 16 — Heat mixture

Specific Capacity [mAh/g]

Cycle (n)

□ Conventional CSPG

◇ Anode particles made according to an embodiment described herein

ANODE PARTICLES INCLUDING DISCARDED GRAPHITE PARTICLES, AND METHODS OF PRODUCING THE SAME

CROSS-REFERENCE TO RELATED APPLICATIONS

This is a divisional application of U.S. application Ser. No. 18/631,455, filed on Apr. 10, 2024, which claims priority to and the benefit of U.S. Provisional Patent Application No. 63/458,514, filed Apr. 11, 2023, titled "Anode Particles Including Discarded Graphite Particles, and Methods of Producing the Same," the disclosures of which are hereby incorporated by reference in their entirety.

TECHNICAL FIELD

Embodiments described herein relate to production of anode particles using discarded or recycled graphite particles, and methods of producing the same.

BACKGROUND

Graphite is a common anode material used in the manufacture of lithium-ion batteries. Graphite can be included as natural graphite or synthetic graphite. Synthetic graphite has a high environmental and manufacturing cost. Conversely, natural graphite is cheaper but has a low yield of conversion to battery-grade graphite. In either graphite production process, a large amount of material is discarded as waste during the production process. This creates a solid waste problem, as well as a greenhouse gas emissions problem, as large amounts of material are transported and never used in batteries. Incorporation of such discarded material into electrode materials can substantially limit the amount of waste produced from the electrode manufacturing process.

SUMMARY

Embodiments described herein relate to anode particles produced in part from discarded graphite particles, and methods of producing the same. In some aspects, a method of forming carbon-coated anode particles can include mixing a first plurality of graphite particles, a second plurality of graphite particles, and a plurality of graphene particles to form a dry powder. The first plurality of graphite particles include particles rejected from a graphite spheronization process and the second plurality of graphite particles include particles rejected from a graphite micronization process. The method further incudes mixing the dry powder with water and a carbon-containing liquid to form a slurry, spray-drying the slurry to form an agglomerated mix, and heating the agglomerated mix to form carbon-coated anode particles. In some embodiments, the carbon-containing liquid can include a synthetic oil, a polyalphaolephin, mineral oil, flaxseed oil, plant-based oil, seed-based oil, an amphipathic carrier, a modified starch, a carbohydrate, maltodextrin, cyclodextrin, hydroxypropyl methylcellulose (HPMC), polyvinyl alcohol (PVA) resin, epoxy resin, polyester resin, vinyl ester resin, and/or styrene. In some embodiments, the spray-drying includes atomizing the slurry to form droplets. In some embodiments, the spray-drying can include heating the droplets in a heated chamber to form dried particles. In some embodiments, the spray-drying can include separating the dried particles from heated air via a cyclone separator and/or a bag filter.

BRIEF DESCRIPTION OF THE DRAWINGS

FIG. 3 is a flow diagram of a method of producing an anode particle, according to an embodiment.

FIG. 6 is an illustration of a coated anode particle, according to an embodiment.

FIG. 7 is an illustration of a coated anode particle, according to an embodiment.

FIG. 11 is an SEM image of an anode particle.

DETAILED DESCRIPTION

Figure 1:
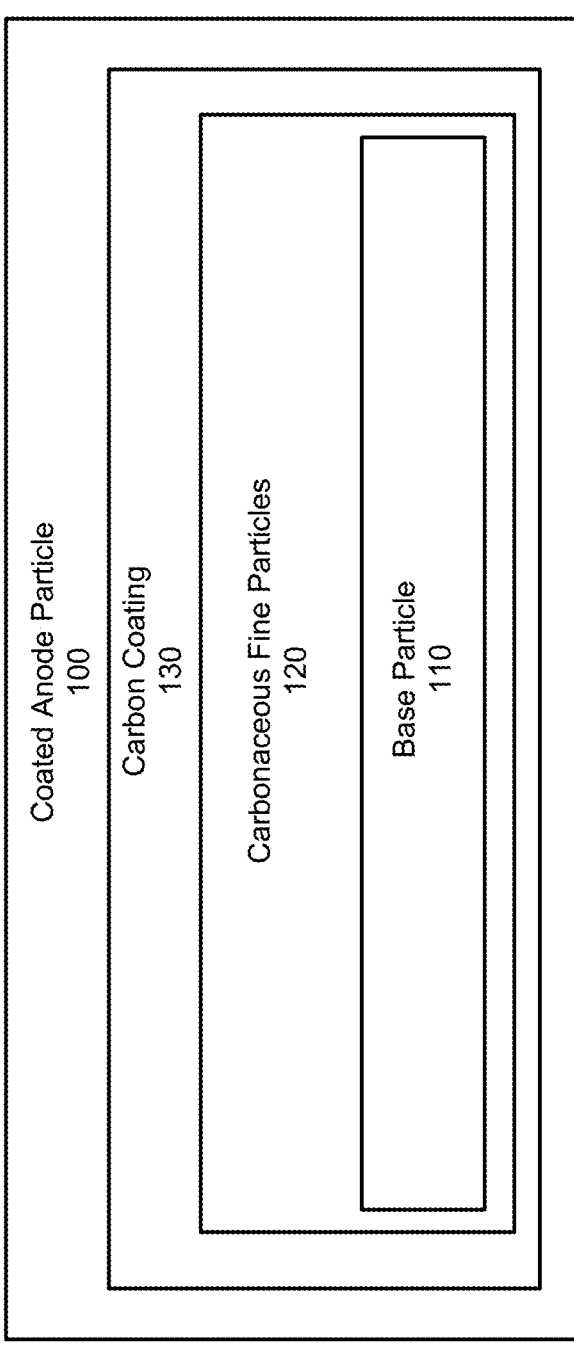
FIG. 1 is a block diagram of a coated anode particle, according to an embodiment.

Currently, natural graphite is widely used for the manufacture of active materials for anodes of lithium-ion batteries. The manufacturing process includes micronization, spheronization, purification, and encapsulation of natural graphite. The micronization and spheronization steps generate by-products that represent 45-55% of the initial material. As described below, these particles are either too small to become spherical, or they are spherical but still too small to meet industry standard specifications for anodes. This significantly increases the cost of battery production, as well as transportation costs with a significant environmental impact. Embodiments described herein curb this waste problem by converting finer particles of graphite into an active material for the production of battery anodes.

Production of battery grade anode material from natural graphite often includes two major steps: (1) micronization; and (2) spheronization. These process steps aid in developing anode particles with a proper shape and size. Graphite subject to these process steps can have an appropriate size distribution and can develop a round, granular, and/or spherical shape. A by-product of micronization of graphite includes fine graphite particles that are too small to become spherical. These flaky particles are not round and often have an average lateral dimension of less than about 10 μm with particles often having a lateral dimension in the range of about 3 μm to about 5 μm in lateral direction. Spheronization of graphite generates round, granular particles, but some of the round particles are still too small to be used as anode material since they do not meet strict surface area and tap density requirements of such particles in the electrode production industry. Rejected particles from the spheronization process can often have average dimensions between about 5 μm and about 10 μm. During the transformation from a flake shape to a sphere, some of the rejected particles have broken and become too small to be usable as anode particles. Some rejected particles can have an edge-trimmed flake shape. Some rejected particles can have a shape of cuboids with rounded corners. Some of the rejected particles can be incompletely rounded. Some of the rejected particles are fully rounded but are too small to make an acceptable anode particle.

Embodiments described herein use the particles rejected from the spheronization process as base particles for the production of coated anode particles. Particles rejected from the micronization process are coated on the outside of the base particles together with other carbonaceous materials to form a larger granular secondary particle via a spray-drying process. The newly formed granular particles are coated with a carbon-containing liquid or resin that is then carbonized to create a conductive carbon coating on the surface of the base particles and to reduce the surface area-to-volume ratio of the coated anode particles.

Embodiments described herein revalorize the rejected streams from the graphite production process into a battery-grade anode material. Embodiments described herein also address the challenge of making larger granular particles from small flakes and granules. Particles produced from methods described herein can be substantially round in shape and have density appropriate for anode production. Batteries produced from anodes described herein can have better charge and discharge kinetics and therefore superior performance, as compared to conventionally produced batteries. These improved kinetics can be related to the increased porosity of the particles, while the external surface area remains relatively low due to carbon coating.

Earlier research describes forming anode particles via spray-drying a mixture of natural and artificial graphite with particle sizes between about 5 μm and about 30 μm and coating them with a carburized polymer resin and a specialized resin. However, such processes do not reutilize reject streams of the spheronization or micronization processes. Such methods do not use a template round particle to improve the efficiency of the production process. Such processes also do not use graphene or carbon black to make a more compact agglomerate via the use of various sizes and shapes of particles. Additionally, they do not use water as the main carrier for spray-drying. Water can be captured and reused when it is employed in the spray-drying process. This provides environmental advantages.

Other research has described the mixing of carbon black and graphite to form conductive agglomerates with surface modification. The resultant product is not used as an anode material, but rather a conductive additive in batteries.

In some embodiments, graphene particles or flakes described herein can have any of the properties of the graphene flakes described in U.S. Pat. No. 9,469,542 ("the '542 patent"), filed Dec. 22, 2015 and titled, "Large Scale Production of Thinned Graphite, Graphene, and Graphite-Graphene Composites," the disclosure of which is hereby incorporated by reference in its entirety.

As used herein, the term "crystalline graphite" or "precursor crystalline graphite" refers to graphite-based material of a crystalline structure with a size configured to allow ball milling in a ball milling jar. For example, the crystalline graphite can be layered graphene sheets with or without defects, such defects comprising vacancies, interstitials, line defects, etc. The crystalline graphite may come in diverse forms, such as but not limited to ordered graphite including natural crystalline graphite, pyrolytic graphite (e.g., highly ordered pyrolytic graphite (HOPG)), graphite fiber, graphite rods, graphite minerals, graphite powder, flake graphite, any graphitic material modified physically and/or chemically to be crystalline, and/or the like. As another example, the crystalline graphite can be graphite oxide.

As used herein, the term "thinned graphite" refers to crystalline graphite that has had its thickness reduced to a thickness from about a single layer of graphene to about 1,200 layers, which is roughly equivalent to about 400 nm. As such, single layer graphene sheets, few-layer graphene (FLG) sheets, and in general multi-layer graphene sheets with a number of layers about equal to or less than 1,200 graphene layers can be referred as thinned graphite.

As used herein, the term "few-layer graphene" (FLG) refers to crystalline graphite that has a thickness from about 1 graphene layer to about 10 graphene layers.

As used herein, the term "lateral size" or "lateral sheet size" relates to the in-plane linear dimension of a crystalline material. For example, the linear dimension can be a radius, diameters, width, length, diagonal, etc., if the in-plane shape of the material can be at least approximated as a regular geometrical object (e.g., circle, square, etc.). If the in-plane shape of the material cannot be modeled by regular geometrical objects relatively accurately, the linear dimension can be expressed by characteristic parameters as is known in the art (e.g., by using shape or form factors).

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, "average dimension" refers to an average distance across a 3-dimensional particle. For a spherical particle, an average dimension would refer to the spherical particle's diameter. For an irregularly shaped particle, the average dimension would refer to the average distance across the particle across all imaginary lines running through the center of mass of the particle.

Figure 2:
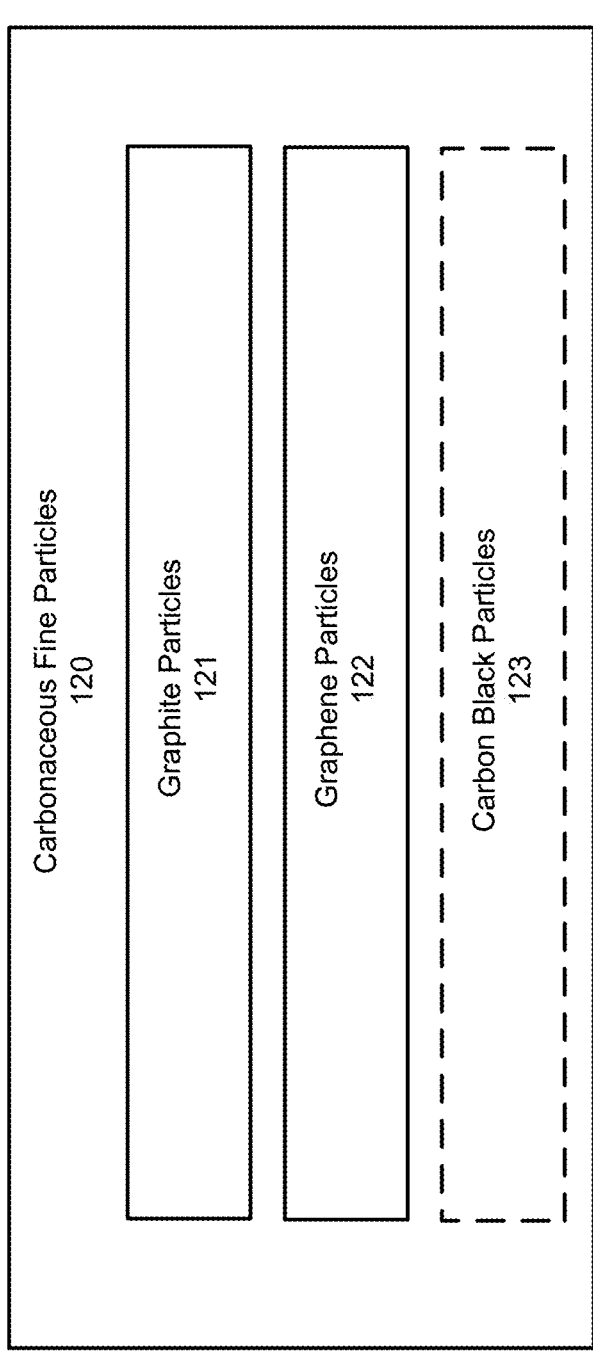
FIG. 2 is a block diagram of a carbonaceous fine particle, according to an embodiment.

FIG. 1 and FIG. 2 show block diagrams of a coated anode particle 100 and various aspects thereof, according to an embodiment. As shown, the coated anode particle 100 includes a base particle 110 covered with carbonaceous fine particles 120 and a carbon coating 130. FIG. 1 shows the coated anode particle 100 while FIG. 2 shows greater detail of the carbonaceous fine particles 120. As shown, the carbonaceous fine particles 120 include graphite particles 121, graphene particles 122, and optionally carbon black particles 123.

The base particle 110 can include a rejected stream from the spheronization process for production of spherical graphite. In some embodiments, the base particle 110 can include carbon. In some embodiments, the base particle 110 can include silicon. In some embodiments, the base particle 110 can include fine silicon. The silicon can be added to the particles rejected from the spheronization process. In some embodiments, the base particle 110 can be round. In some embodiments, the diameter of the base particle 110 can be too small to meet battery grade specifications. In some embodiments, the base particle 110 can have an average dimension of at least about 4 μm, at least about 4.5 μm, at least about 5 μm, at least about 5.5 μm, at least about 6 μm, at least about 6.5 μm, at least about 7 μm, at least about 7.5 μm, at least about 8 μm, at least about 8.5 μm, at least about 9 μm, at least about 9.5 μm, at least about 10 μm, at least about 10.5 μm, at least about 11 μm, or at least about 11.5 μm. In some embodiments, the base particle 110 can have an average dimension of no more than about 12 μm, no more than about 11.5 μm, no more than about 11 μm, no more than about 10.5 μm, no more than about 10 μm, no more than about 9.5 μm, no more than about 9 μm, no more than about 8.5 μm, no more than about 8 μm, no more than about 7.5 μm, no more than about 7 μm, no more than about 6.5 μm, no more than about 6 μm, no more than about 5.5 μm, no more than about 5 μm, or no more than about 4.5 μm. Combinations of the above-referenced diameters of the base particle 110 are also possible (e.g., at least about 4 μm and no more than about 12 μm or at least about 6 μm and no more than about 10 μm), inclusive of all values and ranges therebetween. In some embodiments, the base particle 110 can have an average dimension of about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, about 10 μm, about 10.5 μm, about 11 μm, about 11.5 μm, or about 12 μm.

In some embodiments, the base particle 110 can have an edge-trimmed flake shape. In some embodiments, the base particle 110 can have a cuboid shape with rounded corners. In some embodiments, the base particle 110 can have a sphericity of at least about 0.7, at least about 0.75, at least about 0.8, at least about 0.85, at least about 0.9, at least about 0.91, at least about 0.92, at least about 0.93, at least about 0.94, at least about 0.95, at least about 0.96, at least about 0.97, at least about 0.98, at least about 0.99, at least about 0.991, at least about 0.992, at least about 0.993, at least about 0.994, at least about 0.995, at least about 0.996, at least about 0.997, at least about 0.998, or at least about 0.999. In some embodiments, the base particle 110 can have a sphericity of no more than about 1, no more than about 0.999, no more than about 0.998, no more than about 0.997, no more than about 0.996, no more than about 0.995, no more than about 0.994, no more than about 0.993, no more than about 0.992, no more than about 0.991, no more than about 0.99, no more than about 0.98, no more than about 0.97, no more than about 0.96, no more than about 0.95, no more than about 0.94, no more than about 0.93, no more than about 0.92, no more than about 0.91, no more than about 0.9, no more than about 0.85, no more than about 0.8, or no more than about 0.75. Combinations of the above-referenced sphericities of the base particle 110 are also possible (e.g., at least about 0.7 and no more than about 1 or at least about 0.95 and no more than about 0.995), inclusive of all values and ranges therebetween. In some embodiments, the base particle 110 can have a sphericity of about 0.7, about 0.75, about 0.8, about 0.85, about 0.9, about 0.91, about 0.92, about 0.93, about 0.94, about 0.95, about 0.96, about 0.97, about 0.98, about 0.99, about 0.991, about 0.992, about 0.993, about 0.994, about 0.995, about 0.996, about 0.997, about 0.998, about 0.999, or about 1.

In some embodiments, the base particle 110 can make up at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, at least about 15 wt %, at least about 20 wt %, at least about 25 wt %, at least about 30 wt %, or at least about 35 wt % of the coated anode particle 100. In some embodiments, the base particle 110 can make up no more than about 40 wt %, no more than about 35 wt %, no more than about 30 wt %, no more than about 25 wt %, no more than about 20 wt %, no more than about 15 wt %, no more than about 10 wt %, no more than about 9 wt %, no more than about 8 wt %, no more than about 7 wt %, no more than about 6 wt %, no more than about 5 wt %, no more than about 4 wt %, no more than about 3 wt %, or no more than about 2 wt % of the coated anode particle 100. Combinations of the above-referenced weight percentages are also possible (e.g., at least about 1 wt % and no more than about 40 wt % or at least about 10 wt % and no more than about 30 wt %), inclusive of all values and ranges therebetween. In some embodiments, the base particle 110 can make up about 1 wt %, about 2 wt %, about 3 wt %, about 4 wt %, about 5 wt %, about 6 wt %, about 7 wt %, about 8 wt %, about 9 wt %, about 10 wt %, about 15 wt %, about 20 wt %, about 25 wt %, about 30 wt %, about 35 wt %, or about 40 wt % of the coated anode particle 100.

As shown, the carbonaceous fine particles 120 include graphite particles 121 and graphene particles 122. The carbonaceous fine particles 120 can optionally include carbon black particles 123. In some embodiments, the carbonaceous fine particles 120 can make up at least about 5 wt %, at least about 10 wt %, at least about 15 wt %, at least about 20 wt %, at least about 25 wt %, at least about 30 wt %, at least about 35 wt %, at least about 40 wt %, or at least about 45 wt % of the coated anode particle 100. In some embodiments, the carbonaceous fine particles 120 can make up no more than about 50 wt %, no more than about 45 wt %, no more than about 40 wt %, no more than about 35 wt %, no more than about 30 wt %, no more than about 25 wt %, no more than about 20 wt %, no more than about 15 wt %, or no more than about 10 wt % of the coated anode particle 100. Combinations of the above-referenced weight percentages are also possible (e.g., at least about 5 wt % and no more than about 50 wt % or at least about 15 wt % and no more than about 40 wt %), inclusive of all values and ranges therebetween. In some embodiments, the carbonaceous fine particles 120 can make up about 5 wt %, about 10 wt %, about 15 wt %, about 20 wt %, about 25 wt %, about 30 wt %, about 35 wt %, about 40 wt %, about 45 wt %, or about 50 wt % of the coated anode particle 100.

The graphite particles 121 include rejected particles from the micronization process. In some embodiments, the graphite particles 121 can make up at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 96 wt %, at least about 97 wt %, or at least about 98 wt % of the carbonaceous fine particles 120. In some embodiments, the graphite particles 121 can make up no more than about 99 wt %, no more than about 98 wt %, no more than about 97 wt %, no more than about 96 wt %, no more than about 95 wt %, no more than about 90 wt %, no more than about 85 wt %, no more than about 80 wt %, no more than about 75 wt %, no more than about 70 wt %, no more than about 65 wt %, no more than about 60 wt %, or no more than about 55 wt % of the carbonaceous fine particles 120. Combinations of the above-referenced weight percentages are also possible (e.g., at least about 50 wt % and no more than about 99 wt % or at least about 65 wt % and no more than about 90 wt %), inclusive of all values and ranges therebetween. In some embodiments, the graphite particles 121 can make up about 50 wt %, about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, or about 99 wt % of the carbonaceous fine particles 120.

In some embodiments, the graphite particles 121 can include flaky particles. In some embodiments, the graphite particles 121 can have a thickness and a lateral dimension. In some embodiments, the graphite particles 121 can have a lateral dimension of at least about 2 μm, at least about 2.5 μm, at least about 3 μm, at least about 3.5 μm, at least about 4 μm, at least about 4.5 μm, at least about 5 μm, at least about 5.5 μm, at least about 6 μm, at least about 6.5 μm, at least about 6 μm, at least about 7.5 μm, at least about 8 μm, at least about 8.5 μm, at least about 9 μm, or at least about 9.5 μm. In some embodiments, the graphite particles 121 can have a lateral dimension of no more than about 10 μm, no more than about 9.5 μm, no more than about 9 μm, no more than about 8.5 μm, no more than about 8 μm, no more than about 7.5 μm, no more than about 7 μm, no more than about 6.5 μm, no more than about 6 μm, no more than about 5.5 μm, no more than about 5 μm, no more than about 4.5 μm, no more than about 4 μm, no more than about 3.5 μm, no more than about 3 μm, or no more than about 2.5 μm. Combinations of the above-referenced lateral dimensions are also possible (e.g., at least about 2 μm and no more than about 10 μm or at least about 4 μm and no more than about 9 μm). In some embodiments, the graphite particles 121 can have a lateral dimension of about 2 μm, about 2.5 μm, about 3 μm, about 3.5 μm, about 4 μm, about 4.5 μm, about 5 μm, about 5.5 μm, about 6 μm, about 6.5 μm, about 6 μm, about 7.5 μm, about 8 μm, about 8.5 μm, about 9 μm, about 9.5 μm, or about 10 μm.

In some embodiments, the graphite particles 121 can have a thickness dimension of at least about 5 nm, at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 300 nm, at least about 400 nm, at least about 500 nm, at least about 600 nm, at least about 700 nm, at least about 800 nm, at least about 900 nm, at least about 1 μm, at least about 1.5 μm, at least about 2 μm, at least about 2.5 μm, at least about 3 μm, at least about 3.5 μm, at least about 4 μm, or at least about 4.5 μm. In some embodiments, the graphite particles 121 can have a thickness dimension of no more than about 5 μm, no more than about 4.5 μm, no more than about 4 μm, no more than about 3.5 μm, no more than about 3 μm, no more than about 2.5 μm, no more than about 2 μm, no more than about 1.5 μm, no more than about 1 μm, no more than about 900 nm, no more than about 800 nm, no more than about 700 nm, no more than about 600 nm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, no more than about 30 nm, no more than about 20 nm, or no more than about 10 nm. Combinations of the above-referenced thickness dimensions are also possible (e.g., at least about 5 nm and no more than about 5 μm or at least about 50 nm and no more than about 500 nm), inclusive of all values and ranges therebetween. In some embodiments, the graphite particles 121 can have a thickness dimension of about 5 nm, about 10 nm, about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 μm, about 1.5 μm, about 2 μm, about 2.5 μm, about 3 μm, about 3.5 μm, about 4 μm, about 4.5 μm, or about 5 μm.

The graphene particles 122 are included in the carbonaceous fine particles 120. In some embodiments, the graphene particles 122 can make up at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, at least about 15 wt %, at least about 20 wt %, at least about 25 wt %, at least about 30 wt %, at least about 35 wt %, at least about 40 wt %, or at least about 45 wt % of the carbonaceous fine particles 120. In some embodiments, the graphene particles 122 can make up no more than about 50 wt %, no more than about 45 wt %, no more than about 40 wt %, no more than about 35 wt %, no more than about 30 wt %, no more than about 25 wt %, no more than about 20 wt %, no more than about 15 wt %, no more than about 10 wt %, no more than about 9 wt %, no more than about 8 wt %, no more than about 7 wt %, no more than about 6 wt %, no more than about 5 wt %, no more than about 4 wt %, no more than about 3 wt %, no more than about 2 wt %, no more than about 1 wt %, no more than about 0.9 wt %, no more than about 0.8 wt %, no more than about 0.7 wt %, no more than about 0.6 wt %, no more than about 0.5 wt %, no more than about 0.4 wt %, no more than about 0.3 wt %, or no more than about 0.2 wt % of the carbonaceous fine particles 120. Combinations of the above-referenced weight percentages are also possible (e.g., at least about 0.1 wt % and no more than about 50 wt % or at least about 10 wt % and no more than about 40 wt %), inclusive of all values and ranges therebetween. In some embodiments, the graphene particles 122 can make up about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt %, about 20 wt %, about 25 wt %, about 30 wt %, about 35 wt %, about 40 wt %, about 45 wt %, or about 50 wt % of the carbonaceous fine particles 120.

In some embodiments, the graphene particles 122 can have any of the physical properties of the graphene flakes described in the '542 patent. In some embodiments, the graphene particles 122 can have a lateral dimension of at least about 10 nm, at least about 50 nm, at least about 100 nm, at least about 500 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, or at least about 20 μm. In some embodiments, the graphene particles 122 can have a lateral dimension of no more than about 30 μm, no more than about 20 μm, no more than about 10 μm, no more than about 5 μm, no more than about 1 μm, no more than about 500 nm, no more than about 100 nm, or no more than about 50 nm. Combinations of the above-referenced lateral dimensions of the graphene particles 122 are also possible (e.g., at least about 10 nm and no more than about 30 μm or at least about 1 μm and no more than about 10 μm), inclusive of all values and ranges therebetween. In some embodiments, the graphene particles 122 can have a lateral dimension of about 10 nm, about 50 nm, about 100 nm, about 500 nm, about 1 μm, about 2 μm, about 3 μm, about 4 μm, about 5 μm, about 6 μm, about 7 μm, about 8 μm, about 9 μm, about 10 μm, about 20 μm, or about 30 μm.

In some embodiments, the graphene particles 122 can have a thickness of at least about 1 graphene layer, at least about 2 graphene layers, at least about 3 graphene layers, at least about 4 graphene layers, at least about 5 graphene layers, at least about 6 graphene layers, at least about 7 graphene layers, at least about 8 graphene layers, at least about 9 graphene layers, at least about 10 graphene layers, at least about 11 graphene layers, at least about 12 graphene layers, at least about 13 graphene layers, at least about 14 graphene layers, at least about 15 graphene layers, at least about 16 graphene layers, at least about 17 graphene layers, at least about 18 graphene layers, or at least about 19 graphene layers. In some embodiments, the graphene particles 122 can have a thickness of no more than about 20 graphene layers, no more than about 19 graphene layers, no more than about 18 graphene layers, no more than about 17 graphene layers, no more than about 16 graphene layers, no more than about 15 graphene layers, no more than about 14 graphene layers, no more than about 13 graphene layers, no more than about 12 graphene layers, no more than about 11 graphene layers, no more than about 10 graphene layers, no more than about 9 graphene layers, no more than about 8 graphene layers, no more than about 7 graphene layers, no more than about 6 graphene layers, no more than about 5 graphene layers, no more than about 4 graphene layers, no more than about 3 graphene layers, or no more than about 2 graphene layers. Combinations of the above-referenced thicknesses of the graphene particles 122 are also possible (e.g., at least about 1 graphene layer and no more than about 20 graphene layers or at least about 5 graphene layers and no more than about 10 graphene layers), inclusive of all values and ranges therebetween. In some embodiments, the graphene particles 122 can have a thickness of about 1 graphene layer, about 2 graphene layers, about 3 graphene layers, about 4 graphene layers, about 5 graphene layers, about 6 graphene layers, about 7 graphene layers, about 8 graphene layers, about 9 graphene layers, about 10 graphene layers, about 11 graphene layers, about 12 graphene layers, about 13 graphene layers, about 14 graphene layers, about 15 graphene layers, about 16 graphene layers, about 17 graphene layers, about 18 graphene layers, about 19 graphene layers, or about 20 graphene layers.

In some embodiments, the graphene particles 122 can have an aspect ratio of at least about 50, at least about 100, at least about 500, at least about 1,000, at least about 5,000, at least about 10,000, at least about 20,000, at least about 30,000, or at least about 40,000. In some embodiments, the graphene particles 122 can have an aspect ratio of no more than about 50,000, no more than about 40,000, no more than about 30,000, no more than about 20,000, no more than about 10,000, no more than about 5,000, no more than about 1,000, no more than about 500, or no more than about 100. Combinations of the above-referenced aspect ratios are also possible (e.g., at least about 50 and no more than about 50,000 or at least about 500 and no more than about 5,000), inclusive of all values and ranges therebetween. In some embodiments, the graphene particles 122 can have an aspect ratio of about 50, about 100, about 500, about 1,000, about 5,000, about 10,000, about 20,000, about 30,000, about 40,000, or about 50,000.

The carbon black 123 is optional and can be included in the carbonaceous fine particles 120. In some embodiments, the carbon black 123 can make up at least about 0 wt %, at least about 0.5 wt %, at least about 1 wt %, at least about 1.5 wt %, at least about 2 wt %, at least about 2.5 wt %, at least about 3 wt %, at least about 3.5 wt %, at least about 4 wt %, or at least about 4.5 wt % of the carbonaceous fine particles 120. In some embodiments, the carbon black 123 can make up no more than about 5 wt %, no more than about 4.5 wt %, no more than about 4 wt %, no more than about 3.5 wt %, no more than about 3 wt %, no more than about 2.5 wt %, no more than about 2 wt %, no more than about 1.5 wt %, or no more than about 1 wt % of the carbonaceous fine particles 120. Combinations of the above-referenced weight percentages are also possible (e.g., at least about 0 wt % and no more than about 5 wt % or at least about 1 wt % and no more than about 4 wt %), inclusive of all values and ranges therebetween. In some embodiments, the carbon black 123 can make up about 0 wt %, about 0.5 wt %, about 1 wt %, about 1.5 wt %, about 2 wt %, about 2.5 wt %, about 3 wt %, about 3.5 wt %, about 4 wt %, about 4.5 wt %, or about 5 wt % of the carbonaceous fine particles 120.

In some embodiments, the carbon black 123 can be characterized by its ASTM designation. In some embodiments, the carbon black 123 can include N110, N220, N234, N326, N330, N339, N351, N375, N550, N660, N774, N990, or any combination thereof. In some embodiments, the carbon black 123 can have a primary particle size of about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 350 nm, about 400 nm, or about 450 nm, inclusive of all values and ranges therebetween. The choice of the grade of the carbon black 123 can be based on the rheological and density preferences to adjust the viscosity of a slurry used in production of the coated anode particle 100. For example, larger particles of carbon black 123 can produce a more viscous slurry. In some embodiments, the carbon black 123 can be selected to create a dense agglomerate. In some embodiments, the carbon black 123 can include a mix of several grades of carbon black 123.

The carbon coating 130 is coated on the outside of the coated anode particle 100. In some embodiments, the carbon coating 130 can be formed from a carbon-containing liquid and a water. In some embodiments, the carbon coating 130 can be at least partially carbonized. In some embodiments, the carbon coating 130 can be at least partially mixed with the carbonaceous fine particles 120.

FIG. 3 is a flow diagram of a method 10 of forming a coated anode particle. In some embodiments, the coated anode particle can be the same or substantially similar to the anode particle 100, as described above with reference to FIG. 1. As shown, the method 10 includes mixing a first plurality of graphite particles with a second plurality of graphite particles and a plurality of graphene particles to form a dry powder at step 11, mixing the dry powder with water and a carbon-containing liquid to form the slurry at step 12, spray-drying the slurry to form an agglomerated mix at step 13, heating the agglomerated mix to form carbon-coated anode particles at step 14, optionally coating the anode particles at step 15, and optionally heating the mixture again at step 16.

Step 11 includes mixing a first plurality of graphite particles with a second plurality of graphite particles and a plurality of graphene particles to form a dry powder. The first plurality of graphite particles include particles rejected from the spheronization process (i.e., the base particle 110). The second plurality of graphite particles include particles rejected from the micronization process (i.e., the graphite particles 121). The graphene particles can include the graphene particles 122, as described above with reference to FIG. 2.

In some embodiments, the first plurality of graphite particles can make up at least about 5 wt %, at least about 10 wt %, at least about 15 wt %, at least about 20 wt %, at least about 25 wt %, at least about 30 wt %, at least about 35 wt %, at least about 40 wt %, at least about 45 wt % of the dry powder. In some embodiments, the first plurality of graphite particles can make up no more than about 50 wt %, no more than about 45 wt %, no more than about 40 wt %, no more than about 35 wt %, no more than about 30 wt %, no more than about 25 wt %, no more than about 20 wt %, no more than about 15 wt %, or no more than about 10 wt % of the dry powder. Combinations of the above-referenced weight percentages are also possible (e.g., at least about 5 wt % and no more than about 50 wt % or at least about 15 wt % and no more than about 40 wt %), inclusive of all values and ranges therebetween. In some embodiments, the first plurality of graphite particles can make up about 5 wt %, about 10 wt %, about 15 wt %, about 20 wt %, about 25 wt %, about 30 wt %, about 35 wt %, about 40 wt %, about 45 wt %, or about 50 wt % of the dry powder.

In some embodiments, the second plurality of graphite particles can make up at least about 50 wt %, at least about 55 wt %, at least about 60 wt %, at least about 65 wt %, at least about 70 wt %, at least about 75 wt %, at least about 80 wt %, at least about 85 wt %, or at least about 90 wt % of the dry powder. In some embodiments, the second plurality of particles can make up no more than about 95 wt %, no more than about 90 wt %, no more than about 85 wt %, no more than about 80 wt %, no more than about 75 wt %, no more than about 70 wt %, no more than about 65 wt %, no more than about 60 wt %, or no more than about 55 wt % of the dry powder. In some embodiments, the second plurality of graphite particles can make up no more than about 95 wt %, no more than about 90 wt %, no more than about 85 wt %, no more than about 80 wt %, no more than about 75 wt %, no more than about 70 wt %, no more than about 65 wt %, no more than about 60 wt %, or no more than about 55 wt % of the dry powder. Combinations of the above-referenced weight percentages are also possible (e.g., at least about 50 wt % and no more than about 95 wt % or at least about 60 and no more than about 80 wt %), inclusive of all values and ranges therebetween. In some embodiments, the second plurality of graphite particles can make up about 50 wt %, about 55 wt %, about 60 wt %, about 65 %, about 70 wt %, about 75 wt %, about 80 wt %, about 85 wt %, about 90 wt % or about 95 wt % of the dry powder.

In some embodiments, mixing the first plurality of graphite particles, the second plurality of graphite particles, and the graphene particles can be mixed together in a mixing vessel. In some embodiments, the mixing can be via an impeller. In some embodiments, the mixing can be facilitated by an agitator. In some embodiments, the mixing can include vibration-mixing.

Step 12 includes mixing the dry powder with water and a carbon-containing liquid to form a slurry. In some embodiments, the slurry can include a multiphase liquid, wherein solid particles are suspended in the liquid. In some embodiments, the slurry can be homogeneous when the carbon-containing liquid is water-soluble. In some embodiments, the slurry can be non-homogeneous when the carbon-containing liquid is not at least partially water soluble.

In some embodiments, the dry powder can make up at least about 8 wt %, at least about 9 wt %, at least about 10 wt %, at least about 11 wt %, at least about 12 wt %, at least about 13 wt %, at least about 14 wt %, at least about 15 wt %, at least about 16 wt %, at least about 17 wt %, at least about 18 wt %, at least about 19 wt %, at least about 20 wt %, at least about 21 wt %, at least about 22 wt %, at least about 23 wt %, at least about 24 wt %, at least about 25 wt %, at least about 26 wt %, at least about 27 wt %, at least about 28 wt %, at least about 29 wt %, at least about 30 wt %, at least about 31 wt %, at least about 32 wt %, at least about 33 wt %, or at least about 34 wt % of the slurry. In some embodiments, the dry powder can make up no more than about 35 wt %, no more than about 34 wt %, no more than about 33 wt %, no more than about 32 wt %, no more than about 31 wt %, no more than about 30 wt %, no more than about 29 wt %, no more than about 28 wt %, no more than about 27 wt %, no more than about 26 wt %, no more than about 25 wt %, no more than about 24 wt %, no more than about 23 wt %, no more than about 22 wt %, no more than about 21 wt %, no more than about 20 wt %, no more than about 19 wt %, no more than about 18 wt %, no more than about 17 wt %, no more than about 16 wt %, no more than about 15 wt % no more than about 14 wt % no more than about 13 wt % no more than about 12 wt % no more than about 11 wt % no more than about 10 wt %, or no more than about 9 wt % of the slurry. Combinations of the above-referenced weight percentages are also possible (e.g., at least about 8 wt % and no more than about 35 wt % or at least about 20 wt % and no more than about 30 wt %), inclusive of all values and ranges therebetween. In some embodiments, the dry powder can include about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, or about 35 wt % of the slurry.

In some embodiments, the water can make up at least about 45 wt %, at least about 50 wt %, at least about 55 wt %, at least about 60 wt %, at least about 65 wt %, at least about 70 wt %, at least about 75 wt %, at least about 80 wt %, at least about 81 wt %, at least about 82 wt %, at least about 83 wt %, at least about 84 wt %, at least about 85 wt %, or at least about 90 wt % of the slurry. In some embodiments, the water can make up no more than about 91 wt %, no more than about 90 wt %, no more than about 85 wt %, no more than about 84 wt %, no more than about 83 wt %, no more than about 82 wt %, no more than about 81 wt %, no more than about 80 wt %, no more than about 75 wt %, no more than about 70 wt %, no more than about 65 wt %, no more than about 60 wt %, no more than about 55 wt %, or no more than about 50 wt % of the slurry. Combinations of the above-referenced weight percentages are also possible (e.g., at least about 45 wt % and no more than about 91 wt % or at least about 55 wt % and no more than about 75 wt %), inclusive of all values and ranges therebetween. In some embodiments, the water can make up about 45 wt %, about 50 wt %, about 55 wt %, about 60 wt %, about 65 wt %, about 70 wt %, about 75 wt %, about 80 wt %, about 81 wt %, about 82 wt %, about 83 wt %, about 84 wt %, about 85 wt %, about 90 wt %, or about 91 wt % of the slurry.

In some embodiments, the carbon-containing liquid can make up at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, at least about 11 wt %, at least about 12 wt %, at least about 13 wt %, at least about 14 wt %, at least about 15 wt %, at least about 16 wt %, at least about 17 wt %, at least about 18 wt %, or at least about 19 wt % of the slurry. In some embodiments, the carbon-containing liquid can make up no more than about 20 wt %, no more than about 19 wt %, no more than about 18 wt %, no more than about 17 wt %, no more than about 16 wt %, no more than about 15 wt %, no more than about 14 wt %, no more than about 13 wt %, no more than about 12 wt %, no more than about 11 wt %, no more than about 10 wt %, no more than about 9 wt %, no more than about 8 wt %, no more than about 7 wt %, no more than about 6 wt %, no more than about 5 wt %, no more than about 4 wt %, no more than about 3 wt %, or no more than about 2 wt % of the slurry. Combinations of the above-referenced weight percentages are also possible (e.g., at least about 1 wt % and no more than about 20 wt % or at least about 5 wt % and no more than about 15 wt %), inclusive of all values and ranges therebetween. In some embodiments, the carbon-containing liquid can make up about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt % of the slurry.

In some embodiments, the carbon-containing liquid can include a resin. In some embodiments, the carbon-containing liquid can include a carbon rich material that can be carbonized after spray-drying to leave a conductive carbon layer on the surface of the carbon-coated anode particle. In some embodiments, the carbon-containing liquid can reduce the roughness and surface area of the anode particles to make them more suitable for use in a battery electrode. In some embodiments, the carbon-containing liquid can include a water-soluble saccharide such as glucose, sucrose, and/or corn starch. In some embodiments, the carbon-containing liquid can include an oil. In some embodiments, the carbon-containing liquid can include a synthetic oil, a polyalphaolephin, mineral oil, flaxseed oil, a plant-based oil, a seed-based oil, or any combination thereof. In some embodiments, the carbon-containing liquid can include an amphipathic carrier such as a modified starch and/or carbohydrates. In some embodiments, the carbon-containing liquid can include maltodextrin, cyclodextrin, hydroxypropyl methylcellulose (HPMC), polyvinyl alcohol (PVA) resin, epoxy resin, polyester resin, vinyl ester resin, styrene, or any combination thereof. In some embodiments, the carbon-containing liquid can include polyvinylchloride (PVC), plasticized PVC, polyvinylpyrrolidone (PVP), or any combination thereof.

Step 13 includes spray-drying the slurry to form an agglomerated mix. The spray-drying aids in the evaporation of water. The spray-drying also creates agglomerates of carbonaceous mix adhering to the first plurality of particles (i.e., the base particles). Spray-drying is often used in industrial processes for drying a liquid/solid feed to form a dry powder in granular form. This process is used in food industries, pharmaceutical industries, ceramics industries, and chemical industries, among others. In some embodiments, first plurality of particles can be coated via coating methods that mechanically coat pitch powder on the surface of the particles. The particles can then be heated to remove volatiles.

In some embodiments, the spray-drying process can include atomization, drying, and collection. During atomization, the slurry is atomized into small droplets via a spray nozzle. The size of the droplets during atomization is important, as it can affect the surface area and drying time of the anode particles. During the drying process, the droplets can be introduced into a heated chamber. In some embodiments, the heated chamber can include a tall, cylindrical tower. Heated air is blown into the chamber, causing the droplets to lose their water content and create a carbon-rich coating on the surface of the droplets.

In some embodiments, the heated air can have a temperature of at least about 30° C., at least about 40° C., at least about 50° C., at least about 60° C., at least about 70° C., at least about 80° C., at least about 90° C., at least about 100° C., at least about 150° C., at least about 200° C., or at least about 250° C. In some embodiments, the heated air can have a temperature of no more than about 300° C., no more than about 250° C., no more than about 200° C., no more than about 150° C., no more than about 100° C., no more than about 90° C., no more than about 80° C., no more than about 70° C., no more than about 60° C., no more than about 50° C., or no more than about 40° C. Combinations of the above-referenced temperatures are also possible (e.g., at least about 30° C. and no more than about 300° C. or at least about 100° C. and no more than about 250° C.), inclusive of all values and ranges therebetween. In some embodiments, the heated air can have a temperature of about 30° C., about 40° C., about 50° C., about 60° C., about 70° C., about 80° C., about 90° C., about 100° C., about 150° C., about 200° C., about 250° C., or about 300° C.

During the collection step, the granular particles are separated from the heated air. In some embodiments, the separation can be via use of a cyclone separator. In some embodiments, the separation can be via use of a bag filter. In some embodiments, the granular particles can be collected in a hopper at the bottom of the heated chamber. In some embodiments, at least a portion of the heated air can be recirculated. In some embodiments, at least a portion of the heated air can be released into the atmosphere.

The spray-drying process has several benefits. Such a process can produce a dry powder with a consistent particle size and shape, as well as a high production rate. Spray-drying is also a relatively cost-effective process, and particularly good for non-heat-sensitive materials.

Step 14 includes heating the agglomerated mix to form the carbon-coated anode particles. The heat treatment at step 14 turns the carbon-rich layer into a carbon coating (i.e., the carbon coating 130). In some embodiments, step 14 can include carbonizing the carbon-rich layer formed on the surface of the agglomerates. Carbonization can be defined as a pyrolytic or thermochemical reaction, wherein heat is provided to create conductive carbon from a carbon-rich material. The carbonization promotes the removal of non-carbon materials from the carbon-coated anode particles, improving the conductivity of the carbon coating. In some embodiments, carbonization can be performed under a pressure greater than atmospheric pressure (e.g., at least about 0.1 bar (gauge), at least about 0.2 bar, at least about 0.3 bar, at least about 0.4 bar, at least about 0.5 bar, at least about 0.6 bar, at least about 0.7 bar, at least about 0.8 bar, at least about 0.9 bar, at least about 1 bar, at least about 2 bar, at least about 3 bar, at least about 4 bar, at least about 5 bar, at least about 6 bar, at least about 7 bar, at least about 8 bar, at least about 9 bar, or at least about 10 bar, inclusive of all values and ranges therebetween). In some embodiments, an acid can be used as an oxidizer for carbonization. In other words, step 14 can include acid treatment. In some embodiments, the acid can include phosphoric acid ($H_3PO_4$), sulfuric acid ($H_2SO_4$), nitric acid ($HNO_3$), hypochlorous acid (HOCl), hypobromous acid (HOBr), hypoiodous acid (HOI), iodic acid ($HIO_3$), or any combination thereof. In some embodiments, the carbonization can occur in an inert environment (e.g., with no oxygen or substantially no oxygen). In some embodiments, the carbonization can occur in an all-nitrogen environment. In some embodiments, the inert gas can include, nitrogen, argon, neon, or any combination thereof. In some embodiments, the carbonization can occur via decomposition of the resin in the carbon-containing liquid and extraction of volatiles.

In some embodiments, the carbonization can occur at a temperature of at least about 150° C., at least about 160° C., at least about 170° C., at least about 180° C., at least about 190° C., at least about 200° C., at least about 210° C., at least about 220° C., at least about 230° C., at least about 240° C., at least about 250° C., at least about 260° C., at least about 270° C., at least about 280° C., at least about 290° C., at least about 300° C., at least about 310° C., at least about 320° C., at least about 330° C., at least about 340° C., at least about 350° C., at least about 360° C., at least about 370° C., at least about 380° C., at least about 390° C., at least about 400° C., at least about 410° C., at least about 420° C., at least about 430° C., at least about 440° C., at least about 450° C., at least about 460° C., at least about 470° C., at least about 480° C., or at least about 490° C. In some embodiments, the carbonization can occur at a temperature of no more than about 500° C., no more than about 490° C., no more than about 480° C., no more than about 470° C., no more than about 460° C., no more than about 450° C., no more than about 440° C., no more than about 430° C., no more than about 420° C., no more than about 410° C., no more than about 400° C., no more than about 390° C., no more than about 380° C., no more than about 370° C., no more than about 360° C., no more than about 350° C., no more than about 340° C., no more than about 330° C., no more than about 320° C., no more than about 310° C., no more than about 300° C., no more than about 290° C., no more than about 280° C., no more than about 270° C., no more than about 260° C., no more than about 250° C., no more than about 240° C., no more than about 230° C., no more than about 220° C., no more than about 210° C., no more than about 200° C., no more than about 190° C., no more than about 180° C., no more than about 170° C., or no more than about 160° C. Combinations of the above-referenced temperatures are also possible (e.g., at least about 150° C. and no more than about 500° C. or at least about 250° C. and no more than about 450° C.), inclusive of all values and ranges therebetween. In some embodiments, the carbonization can occur at a temperature of about 150° C., about 160° C., about 170° C., about 180° C., about 190° C., about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., about 410° C., about 420° C., about 430° C., about 440° C., about 450° C., about 460° C., about 470° C., about 480° C., about 490° C., or about 500° C.

In some embodiments, the carbonization can occur at a temperature of at least about 700° C., at least about 710° C., at least about 720° C., at least about 730° C., at least about 740° C., at least about 750° C., at least about 760° C., at least about 770° C., at least about 780° C., at least about 790° C., at least about 800° C., at least about 810° C., at least about 820° C., at least about 830° C., at least about 840° C., at least about 850° C., at least about 860° C., at least about 870° C., at least about 880° C., at least about 890° C., at least about 900° C., at least about 910° C., at least about 920° C., at least about 930° C., or at least about 940° C. In some embodiments, the carbonization can occur at a temperature of no more than about 950° C., no more than about 940° C., no more than about 930° C., no more than about 920° C., no more than about 910° C., no more than about 900° C., no more than about 890° C., no more than about 880° C., no more than about 870° C., no more than about 860° C., no more than about 850° C., no more than about 840° C., no more than about 830° C., no more than about 820° C., no more than about 810° C., no more than about 800° C., no more than about 790° C., no more than about 780° C., no more than about 770° C., no more than about 760° C., no more than about 750° C., no more than about 740° C., no more than about 730° C., no more than about 720° C., or no more than about 710° C. Combinations of the above-referenced temperatures are also possible (e.g., at least about 700° C. and no more than about 950° C. or at least about 750° C. and no more than about 900° C.), inclusive of all values and ranges therebetween. In some embodiments, the carbonization can occur at a temperature of about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., or about 950° C.

In some embodiments, the carbonization can have a duration of at least about 1 hour, at least about 1.1 hours, at least about 1.2 hours, at least about 1.3 hours, at least about 1.4 hours, at least about 1.5 hours, at least about 1.6 hours, at least about 1.7 hours, at least about 1.8 hours, at least about 1.9 hours, at least about 2 hours, at least about 2.1 hours, at least about 2.2 hours, at least about 2.3 hours, at least about 2.4 hours, at least about 2.5 hours, at least about 2.6 hours, at least about 2.7 hours, at least about 2.8 hours, or at least about 2.9 hours. In some embodiments, the carbonization can have a duration of no more than about 3 hours, no more than about 2.9 hours, no more than about 2.8 hours, no more than about 2.7 hours, no more than about 2.6 hours, no more than about 2.5 hours, no more than about 2.4 hours, no more than about 2.3 hours, no more than about 2.2 hours, no more than about 2.1 hours, no more than about 2 hours, no more than about 1.9 hours, no more than about 1.8 hours, no more than about 1.7 hours, no more than about 1.6 hours, no more than about 1.5 hours, no more than about 1.4 hours, no more than about 1.3 hours, no more than about 1.2 hours, or no more than about 1.1 hours. Combinations of the above-referenced durations are also possible (e.g., at least about 1 hour and no more than about 3 hours or at least about 1.5 hours and no more than about 2.5 hours), inclusive of all values and ranges therebetween. In some embodiments, the carbonization can have a duration of about 1 hour, about 1.1 hours, about 1.2 hours, about 1.3 hours, about 1.4 hours, about 1.5 hours, about 1.6 hours, about 1.7 hours, about 1.8 hours, about 1.9 hours, about 2 hours, about 2.1 hours, about 2.2 hours, about 2.3 hours, about 2.4 hours, about 2.5 hours, about 2.6 hours, about 2.7 hours, about 2.8 hours, about 2.9 hours, or about 3 hours.

In some embodiments, the heating of the agglomerated mix at step 14 can be in a low oxygen environment. In some embodiments, the heating of the agglomerated mix can be in an environment that is less than about 21 vol %, less than about 20 vol %, less than about 19 vol %, less than about 18 vol %, less than about 17 vol %, less than about 16 vol %, less than about 15 vol %, less than about 14 vol %, less than about 13 vol %, less than about 12 vol %, less than about 11 vol %, less than about 10 vol %, less than about 9 vol %, less than about 8 vol %, less than about 7 vol %, less than about 6 vol %, less than about 5 vol %, less than about 4 vol %, less than about 3 vol %, less than about 2 vol %, or less than about 1 vol % oxygen, inclusive of all values and ranges therebetween. In some embodiments, the heating of the agglomerated mix at step 14 can occur at least partially concurrently with the spray-drying of the slurry at step 13.

At step 15, the anode particles can optionally be coated again. In some embodiments, the anode particles can be coated with a carbon coating. This additional coating can be particularly effective in the case where PVA is used as a carbon-containing liquid. In some embodiments, a precursor can be used to reduce the surface area of the anode particles. In some embodiments, the precursor can include petroleum pitch. For example, a petroleum pitch with a high cooking value (e.g., at least about 50%, at least about 60%, or at least about 70%, inclusive of all values and ranges therebetween) and a high softening temperature (e.g., at least about 150° C., at least about 200° C., or at least about 250° C., inclusive of all values and ranges therebetween).

In some embodiments, additional coating can include at least about 2 wt %, at least about 3 wt %, at least about 4 wt %, at least about 5 wt %, at least about 6 wt %, or at least about 7 wt % precursor material. In some embodiments, the additional coating can include no more than about 8 wt %, no more than about 7 wt %, no more than about 6 wt %, no more than about 5 wt %, no more than about 4 wt %, or no more than about 3 wt % precursor. Combinations of the above-referenced weight percentages are also possible. In some embodiments, additional coating can include about 2 wt %, about 3 wt %, about 4 wt %, about 5 wt %, about 6 wt %, about 7 wt %, or about 8 wt % precursor material.

In some embodiments, the anode particles can undergo graphitization to increase the stability, the conductivity, and/or the packing density of the final electrode. Graphitization can also reduce crystalline defects in the anode particles. In some embodiments, recycled graphite recovered from used batteries can be used for graphitization. In some embodiments, the graphite particles used for graphitization can be coated with a layer of amorphous carbon (e.g., about 1 nm about 2 nm, about 3 nm, about 4 nm, about 5 nm, about 6 nm, about 7 nm, about 8 nm, about 9 nm, or about 10 mm thick), inclusive of all values and ranges therebetween. Such coatings can provide benefits for higher rate performance and lower swelling.

In some embodiments, the graphite particles can go through mechanical treatment (e.g., sonication) and/or chemical treatment (e.g., utilizing pore forming agents) processes to disrupt the structure of graphite and provide access to internal layers for further amorphous carbon coating. In some embodiments, pore forming agents such as salts (e.g., NaCl, KCl) can be applied to the graphite particles to provide more thorough coating performance. In some embodiments, the anode particles can be re-spheronized to increase production yield and/or electro-chemical performance of the anode particles.

Step 16 is optional and includes a second heating operation of the mixture of the anode particles and the additional coating. In other words, step 16 is a second carbonization process. In some embodiments, the second carbonization can be at a temperature of at least about 900° C., at least about 910° C., at least about 920° C., at least about 930° C., at least about 940° C., at least about 950° C., at least about 960° C., at least about 970° C., at least about 980° C., or at least about 990° C. In some embodiments, the second carbonization can be at a temperature of no more than about 1,000° C., no more than about 990° C., no more than about 980° C., no more than about 970° C., no more than about 960° C., no more than about 950° C., no more than about 940° C., no more than about 930° C., no more than about 920° C., or no more than about 910° C. Combinations of the above-referenced temperatures are also possible (e.g., at least about 900° C. and no more than about 1,000° C. or at least about 920° C. and no more than about 980° C.), inclusive of all values and ranges therebetween. In some embodiments, the second carbonization can be at a temperature of about 900° C., about 910° C., about 920° C., about 930° C., about 940° C., about 950° C., about 960° C., about 970° C., about 980° C., about 990° C., or about 1,000° C.

In some embodiments, the second carbonization can have a duration of at least about 5 hours, at least about 5.5 hours, at least about 6 hours, at least about 6.5 hours, at least about 7 hours, at least about 7.5 hours, at least about 8 hours, at least about 8.5 hours, at least about 9 hours, or at least about 9.5 hours. In some embodiments, the second carbonization can have a duration of no more than about 10 hours, no more than about 9.5 hours, no more than about 9 hours, no more than about 8.5 hours, no more than about 8 hours, no more than about 7.5 hours, no more than about 7 hours, no more than about 6.5 hours, no more than about 6 hours, or no more than about 5.5 hours. Combinations of the above-referenced durations are also possible (e.g., at least about 5 hours and no more than about 10 hours or at least about 6 hours and no more than about 9 hours), inclusive of all values and ranges therebetween. In some embodiments, the second carbonization can have a duration of about 5 hours, about 5.5 hours, about 6 hours, about 6.5 hours, about 7 hours, about 7.5 hours, about 8 hours, about 8.5 hours, about 9 hours, about 9.5 hours, or about 10 hours.

Figure 5:
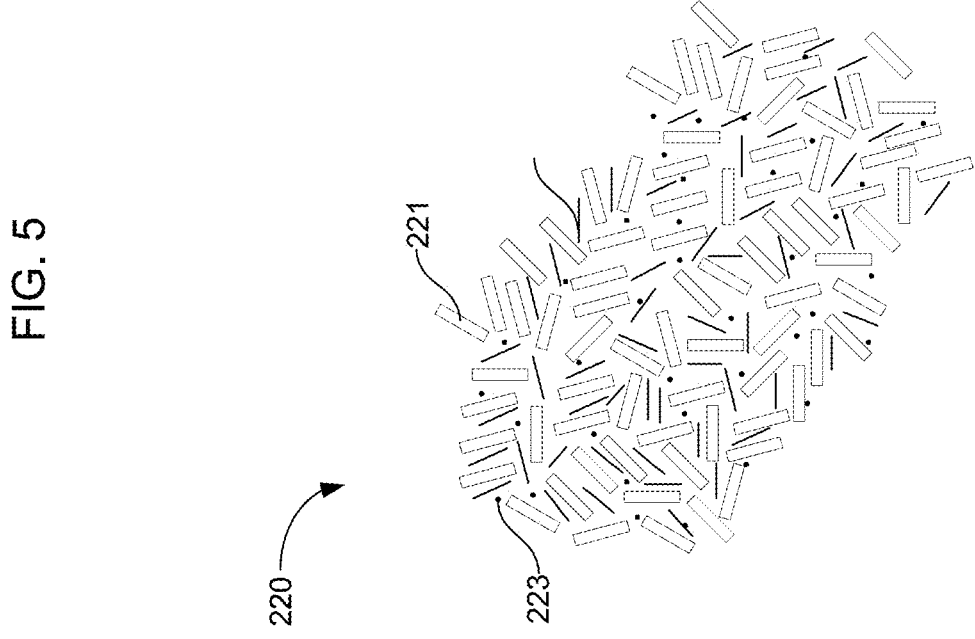
FIG. 5 is an illustration of carbonaceous fine particles, according to an embodiment.
Figure 4:
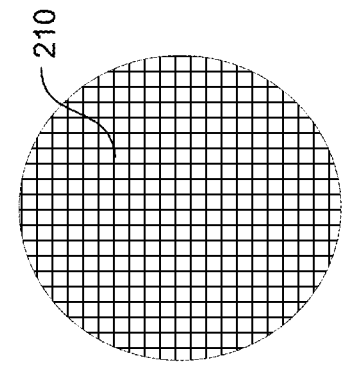
FIG. 4 is an illustration of a base particle, according to an embodiment.
Figure 6:
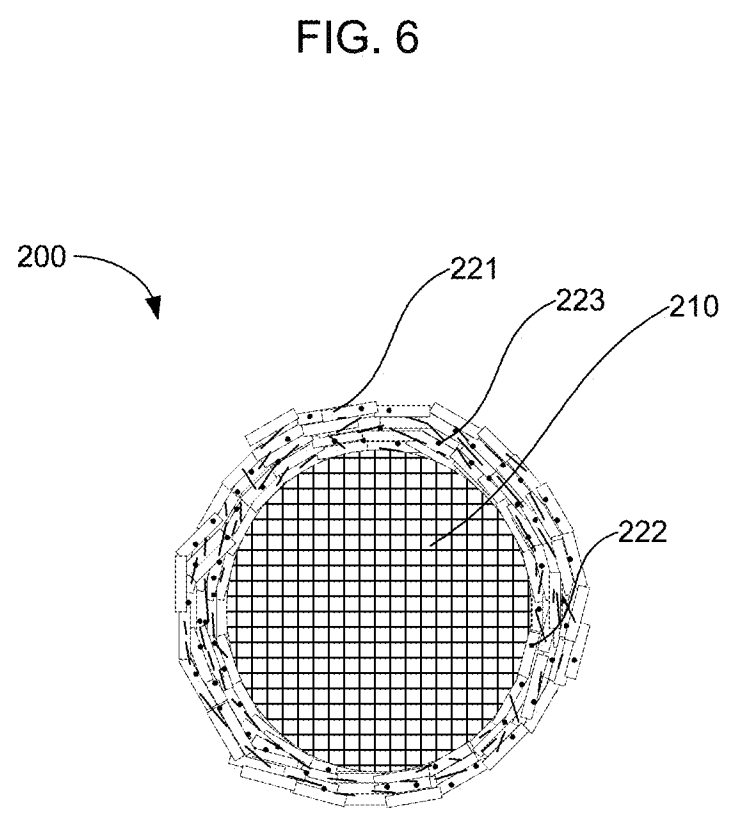
Figure 7:
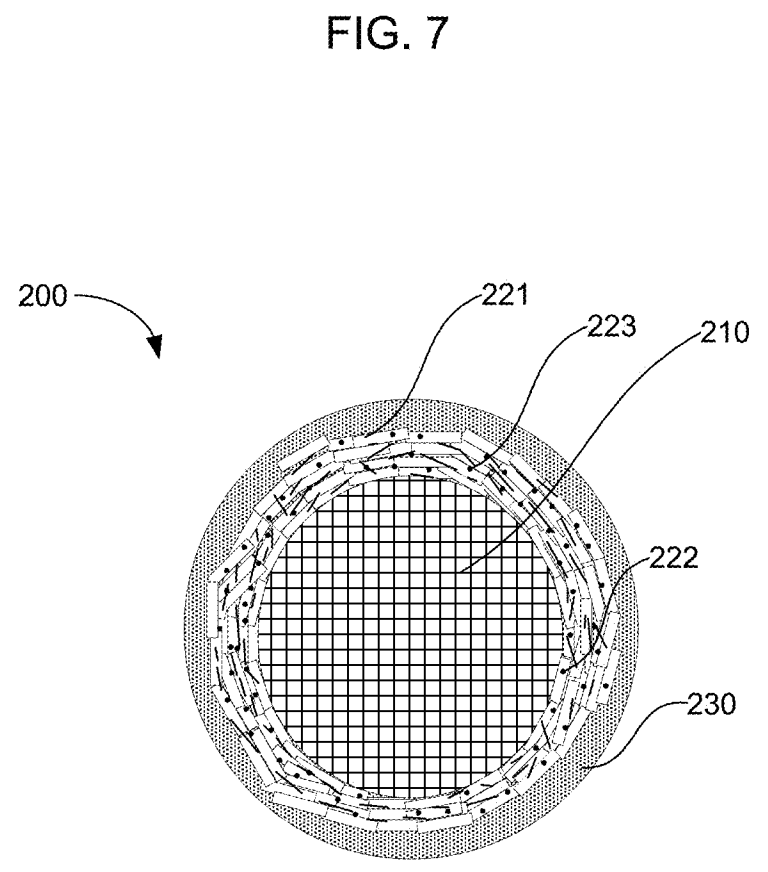

FIGS. 4-7 show a visual representation of a method of producing a carbon-coated anode particle 200, according to an embodiment. As shown, the carbon-coated anode particle 200 includes a base particle 210, carbonaceous fine particles 220 (including graphite particles 221, graphene particles 222, and carbon black particles 223), and a carbon coating 230. In some embodiments, the base particle 210, the carbonaceous fine particle 220, the graphite particles 221, the graphene particles 222, the carbon black particles 223, and the carbon coating 230 can be the same or substantially similar to the base particle 110, the carbonaceous fine particle 120, the graphite particles 121, the graphene particles 122, the carbon black particles 123, and the carbon coating 130, as described above with reference to FIG. 1 and FIG. 2. Thus, certain aspects of the base particle 210, the carbonaceous fine particle 220, the graphite particles 221, the graphene particles 222, the carbon black particles 223, and the carbon coating 230 are not described in greater detail herein. FIG. 4 shows the base particle 210 while FIG. 5 shows the carbonaceous fine particles 220 separated from the base particle 210. FIG. 6 shows the carbonaceous fine particles 220 coated on the outside of the base particle 210. FIG. 7 shows the carbonaceous fine particles 220 and the carbon coating 230 coated on the outside of the base particle 210.

As shown, the graphite particles 221 are layered on the outside of the base particle 210 with a thickness of about 3-5 graphite particles 221 deep. In some embodiments, the graphite particles 221 can be layered on the outside of the base particle 210 in a homogeneous or substantially homogeneous layering scheme (i.e., the same number of layers throughout the full surface of the base particle 210). In some embodiments, the graphite particles 221 can be layered on the outside of the base particle 210 in a heterogeneous layering scheme to promote partial oxidation of the carbonaceous fine particles 220. In some embodiments, the graphite particles 221 can be layered on the outside of the base particle 210 with a thickness of about 1 layer, about 2 layers, about 3 layers, about 4 layers, about 5 layers, about 6 layers, about 7 layers, about 8 layers, about 9 layers, about 10 layers, about 11 layers, about 12 layers, about 13 layers, about 14 layers, about 15 layers, about 16 layers, about 17 layers, about 18 layers, about 19 layers, about 20 layers, about 21 layers, about 22 layers, about 23 layers, about 24 layers, about 25 layers, about 26 layers, about 27 layers, about 28 layers, about 29 layers, or about 30 layers, inclusive of all values and ranges therebetween.

As shown, the carbon coating 230 is disposed on the outside of the carbonaceous fine particles 220. In some embodiments, the carbon coating 230 can have a thickness of at least about 50 nm, at least about 60 nm, at least about 70 nm, at least about 80 nm, at least about 90 nm, at least about 100 nm, at least about 200 nm, at least about 300 nm, at least about 400 nm, at least about 500 nm, at least about 600 nm, at least about 700 nm, at least about 800 nm, at least about 900 nm, at least about 1 μm, at least about 1.5 μm, at least about 2 μm, at least about 2.5 μm, at least about 3 μm, at least about 3.5 μm, at least about 4 μm, or at least about 4.5 μm. In some embodiments, the carbon coating 230 can have a thickness of no more than about 5 μm, no more than about 4.5 μm, no more than about 4 μm, no more than about 3.5 μm, no more than about 3 μm, no more than about 2.5 μm, no more than about 2 μm, no more than about 1.5 μm, no more than about 1 μm, no more than about 900 nm, no more than about 800 nm, no more than about 700 nm, no more than about 600 nm, no more than about 500 nm, no more than about 400 nm, no more than about 300 nm, no more than about 200 nm, or no more than about 100 nm. Combinations of the above-referenced thicknesses are also possible (e.g., at least about 50 nm and no more than about 5 μm or at least about 300 nm and no more than about 1 μm), inclusive of all values and ranges therebetween. In some embodiments, the carbon coating 230 can have a thickness of about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 μm, about 1.5 μm, about 2 μm, about 2.5 μm, about 3 μm, about 3.5 μm, about 4 μm, about 4.5 μm, or about 5 μm.

Figure 8:
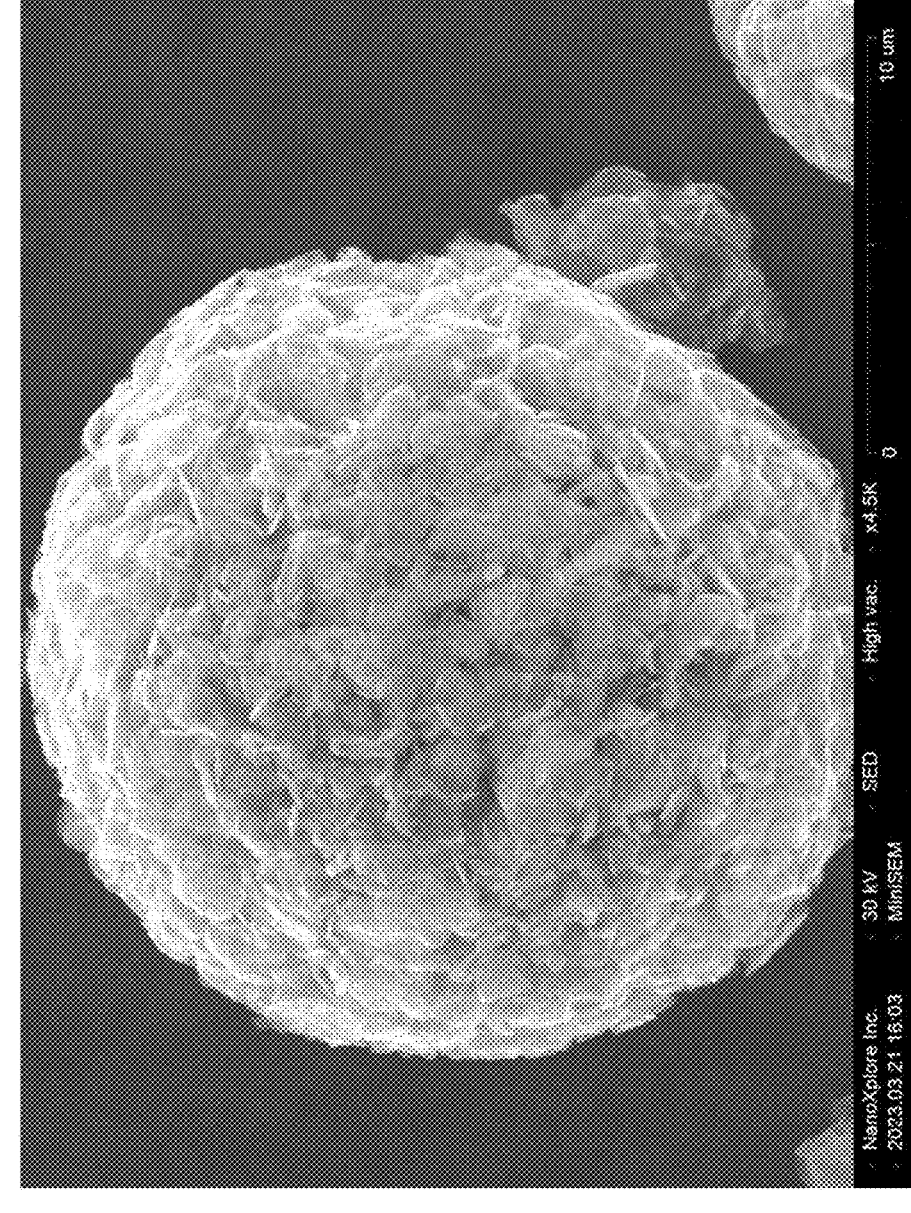
FIG. 8 is a scanning electron microscopy (SEM) image of an anode particle prior to carbon coating.

FIG. 8 is a scanning electron microscopy (SEM) image of an anode particle prior to the addition of carbon coating. This is similar to the base particle 210 with the graphite particles 221, the graphene particles 222, and the carbon black particles 223, as described above with reference to FIG. 6.

Figure 9:
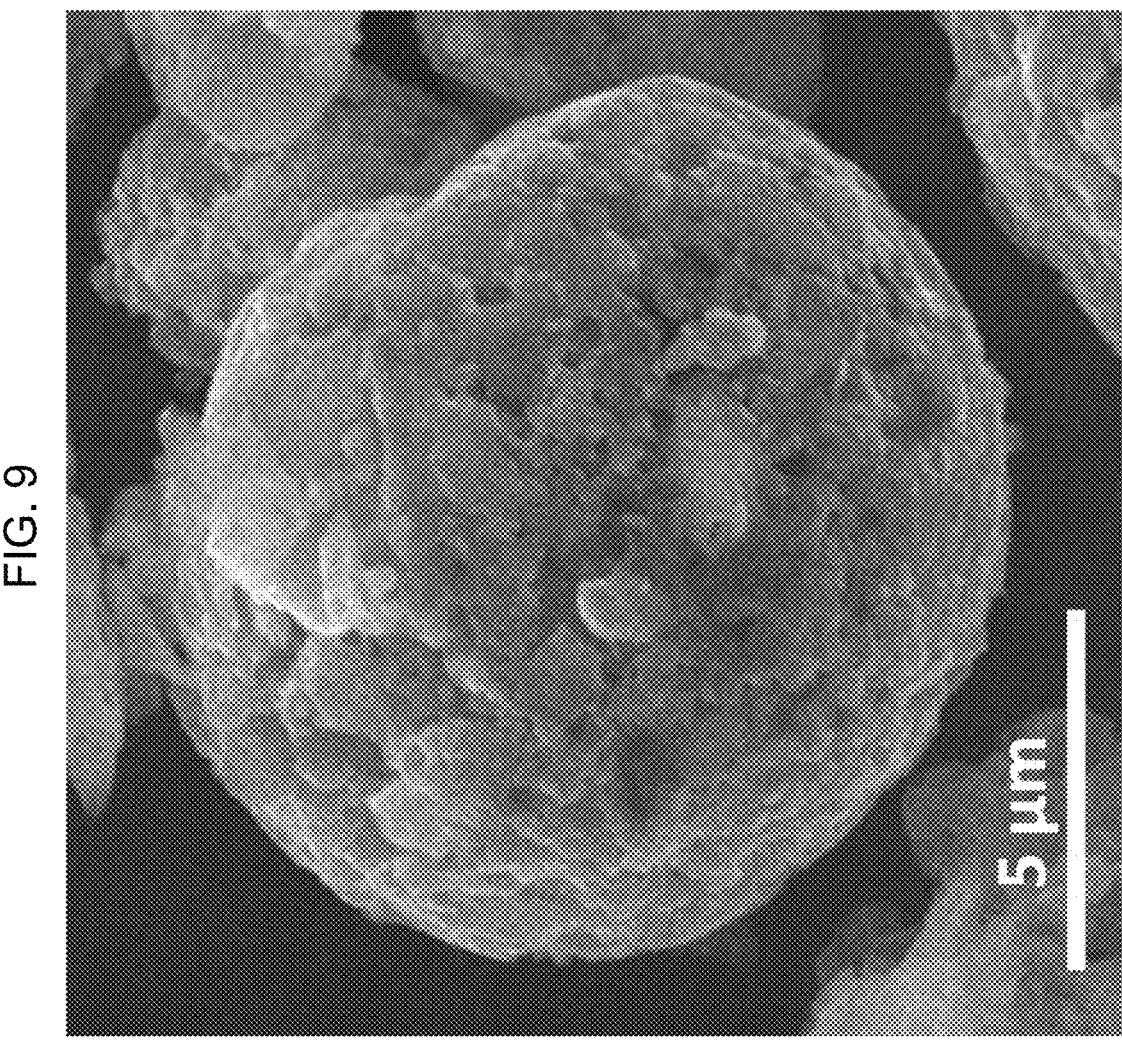
FIG. 9 is an SEM image of a silicon-graphite (SiG) particle.

FIG. 9 is an SEM image of a silicon-graphite (SiG) particle. The anode particle was formed from processes similar to those described above with respect to FIG. 3. As shown, the particle has a particle size of about 12 μm.

Figure 10:
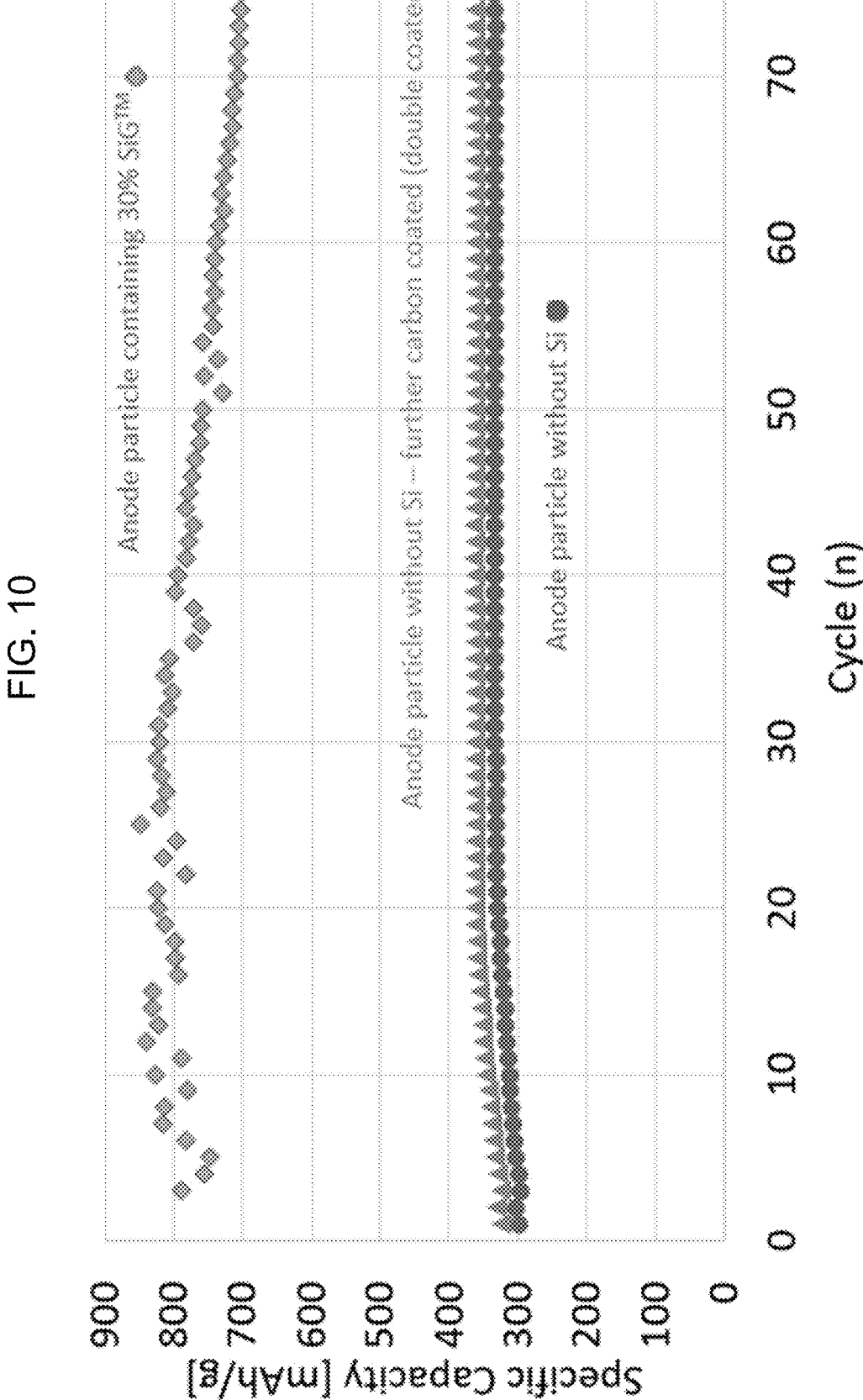
FIG. 10 is a graphical representation of cycle performance for multiple particles

FIG. 10 is a graphical representation of cycle performance for multiple particles. Presented are half cell performances of various anode particles produced via methods described herein. Cells were coin-type half cells. Cells were charged at C/10 to 1.5 V and discharged at C/10 to 0.005 V at a temperature of 23° C. Anode particles including 30 wt % silicon-graphite composite performed on average about 2.5 times better (in terms of specific capacity over successive cycles) than anode particles without silicon or anode particles without silicon and further coated with carbon.

Figure 11:
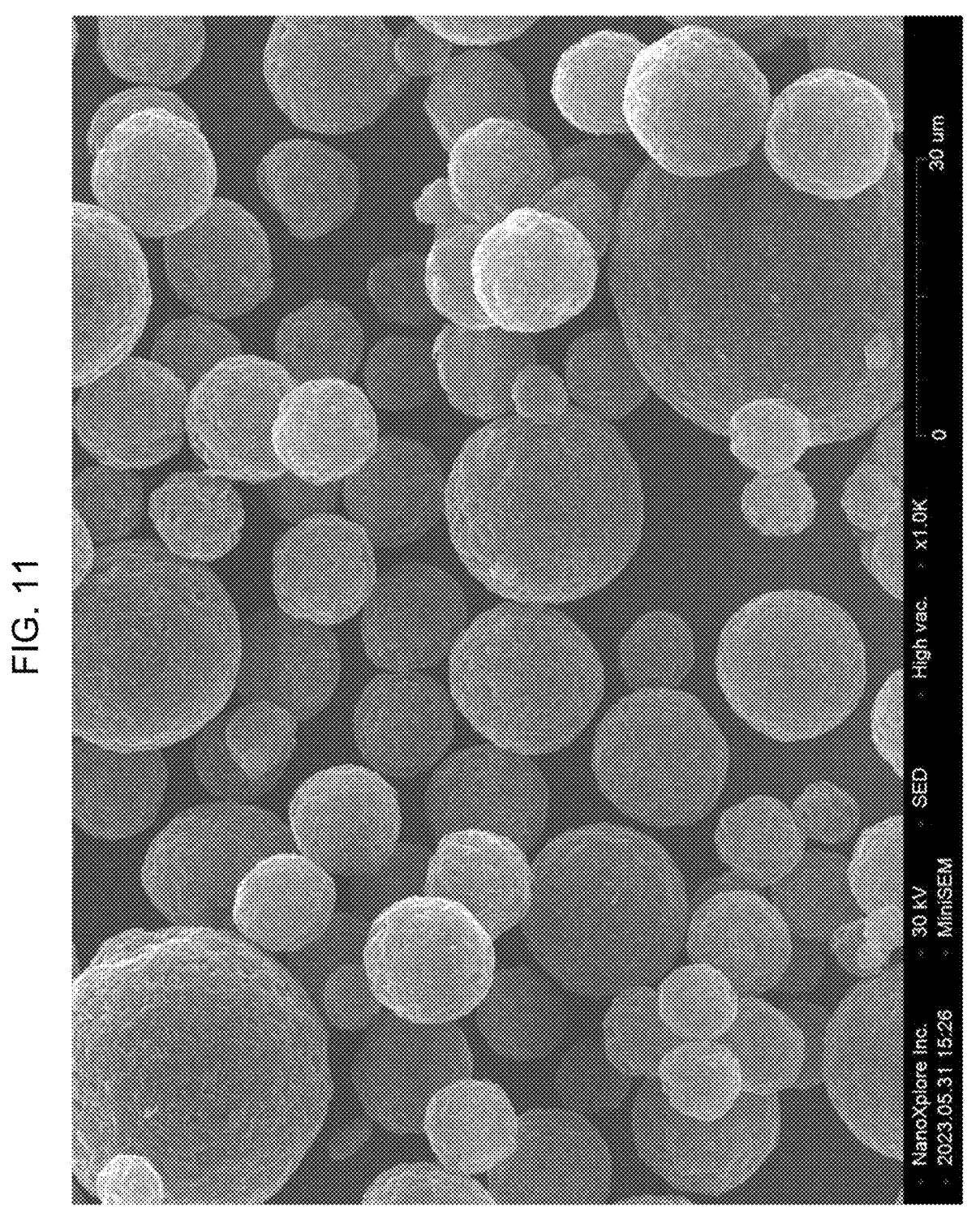

FIG. 11 is an SEM image of anode particles. As shown, the anode particle includes about 15 wt % of carbon-containing liquid. The anode particles have sizes ranging from about 5 μm to about 50 μm.

Figure 12:
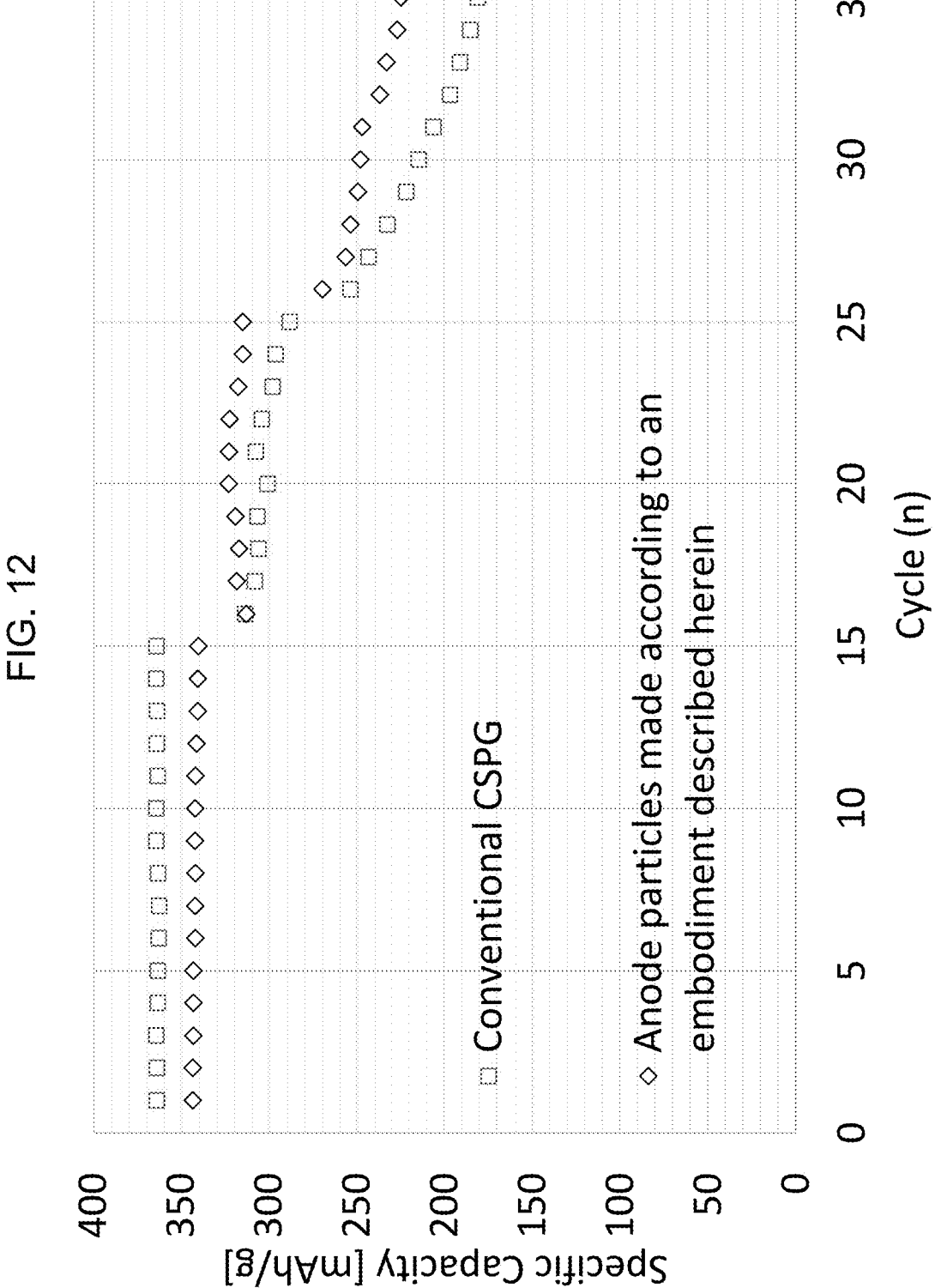
FIG. 12 is a graphical representation of half cell performances of anode particles produced according to processes described herein.

FIG. 12 is a graphical representation of half cell performances of anode particles produced according to processes described herein. Anode particles produced with methods described herein are compared to conventional coated spherical purified graphite (CSPG) particles at 3 C-rates. As shown, the anodes produced with processes described herein perform progressively better than conventional particles as the C-rate increases.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention.

Additionally, certain of the steps may be performed concurrently in a parallel process when possible, as well as performed sequentially as described above. The embodiments have been particularly shown and described, but it will be understood that various changes in form and details may be made.

The invention claimed is:

1. A coated anode particle, comprising:
a base particle including a high-capacity material capable of taking up and releasing ions;
a first coating layer disposed on the base particle, the first coating layer including graphite particles and graphene particles, the graphite particles rejected from a graphite micronization process; and
a second coating layer disposed on the first coating layer, the second coating layer including an amorphous conductive carbon.

2. The coated anode particle of claim 1, wherein the first coating layer further includes carbon black.

3. The coated anode particle of claim 1, wherein the first coating layer includes about 50 wt % to about 99 wt % graphite particles.

4. The coated anode particle of claim 1, wherein the base particle is rejected from a graphite spheronization process.

5. The coated anode particle of claim 1, wherein the coated anode particle has a particle size between about 15 µm and about 25 µm.

6. The coated anode particle of claim 1, wherein the base particle has a particle size between about 5 µm and about 10 µm.

7. The coated anode particle of claim 1, wherein the base particle includes silicon.

* * * * *